Figure 1:
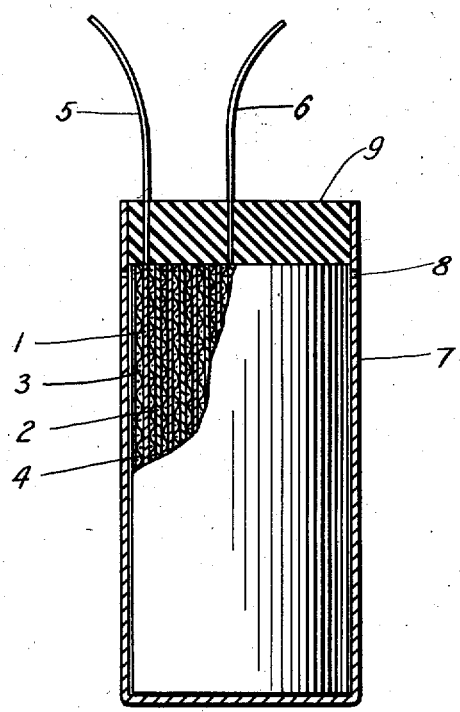

Feb. 25, 1936.  P. ROBINSON  2,031,793
ELECTROLYTIC DEVICE
Filed Aug. 3, 1934

PRESTON ROBINSON
INVENTOR

BY Dorsey & Cole
ATTORNEYS

Patented Feb. 25, 1936

2,031,793

UNITED STATES PATENT OFFICE 2,031,793

ELECTROLYTIC DEVICE

Preston Robinson, Williamstown, Mass., assignor to Sprague Specialties Company, North Adams, Mass., a corporation of Massachusetts Application August 3, 1934, Serial No. 738,346

11 Claims. (Cl. 175—315)

The present invention relates to electrolytic devices and more particularly to electrolytic condensers of the so-called dry type, and to the manufacture of such condensers.

Such condensers, as a rule, comprise two electrodes in the form of foils or plates, one or both of which are of film-forming material, for instance, of aluminum, tantalum, zirconium, etc. The condenser is provided with a suitable electrolyte which is more or less viscous, the consistency of the various electrolytes used, ranging from that of a slightly fluid liquid to that of a heavy paste. The electrolyte may be directly interposed between the electrodes or may be carried by interposed spacers, which spacers may consist of gauze, paper, cellophane, etc. The condenser may be formed as a stacked assembly or may be wound into a roll.

The electrolyte of such condensers usually comprises as ionogen, a weak acid of the type of boric acid, phosphoric acid, citric acid, etc., and preferably also comprises a salt of a weak acid, which salt, however, does not need to be the salt of the acid used, and it is preferably an alkali or ammonium salt of the weak acid.

As solvent of the electrolyte, as a rule, a polyhydric alcohol is used, for instance, glycerol, ethylene glycol, etc., and the solvent usually also comprises a certain amount of water.

The electrolyte may also comprise inert substances, especially for the purpose of increasing its viscosity and/or conductivity, for the first purpose substances of the type of bentonite starch, silica gel, boric acid, etc., and for the second purpose substances of the type of magnetite, graphite, lead-peroxide, colloidal silver, etc., being used.

As described in my copending application Ser. No. 548,270, filed July 1, 1931, to obtain the best operating characteristics of a condenser of this type it is necessary to keep the amount of water in the condenser within predetermined and comparatively narrow limits.

However, during the life of the condenser, and especially when it is in operation, there is a more or less continuous loss of water. This loss is partly due to evaporation of water as water vapor, and partly to the decomposition of the water by electrolytic action; the water being decomposed into hydrogen and oxygen.

While the condensers are as a rule enclosed in a sealed container or otherwise provided with a sealed envelope, provision is made for the escape of the liberated gases as otherwise undue pressure would build up within the container or envelope which would result in the ultimate destruction of the condenser. Through these venting means then pass to the outside the liberated gases, and the developed water vapor, with the result that, if initially the critical amount of water has been present in the electrolyte to obtain the desired characteristics of the condenser, this loss of water deleteriously influences the characteristics of the condenser, for instance by causing a decrease in capacity and an increase of power factor of the condenser.

This condition cannot be remedied by providing right from the start an excess of water in the electrolyte, as an increase of the water content above the critical value, brings about a lowering of the breakdown voltage, as has been fully explained in my above referred to application.

In my copending application Ser. No. 554,536 filed August 1, 1931 now Patent No. 2,012,481, I have described means whereby the loss of water in certain parts of the condenser can be partly compensated by the supply of liquid from other parts of the condenser or from a special electrolyte reservoir provided in the condenser.

Such means, however, only partly reestablish the original condition of the electrolyte and besides that, as a rule, increase the cost of the condenser to a considerable extent.

My present invention provides in a simple and inexpensive manner for a constancy of the water content of the electrolyte, whereby any loss in the water content of the electrolyte is immediately and automatically compensated for by an equal amount of water being added to the electrolyte.

In accordance with my invention I provide in the electrolyte a hydrated substance, which upon a dehydrating influence, brought about in this case by the loss of water of the electrolyte, decomposes so as to give off water. The water so obtained goes into the electrolyte, whereby by proper provisions the same amount of water is obtained by decomposition of the hydrated substance as is lost by the electrolyte, and the water content of the electrolyte is thus automatically maintained at substantially its original and desired value.

The substances to be used in this connection are preferably carbohydrates which are soluble in water, as sugar, sucrose, glucose, dextrose, etc., although insoluble carbohydrates, as starch or other hydrated substances, as hydrated calcium phosphate or hydrated magnesium borate may also be used.

A very well suited carbohydrate for this purpose is sugar, in a refined powdery form, and I shall describe my invention in detail with reference to the use of sugar.

While it has already been suggested to add carbohydrates to electrolytes of dry condensers, for instance, in my copending application Ser. No. 716,714, filed March 21, 1934, the purpose of the addition of carbohydrates to electrolytes has been in the past for entirely different purpose, for instance, to prevent corrosion or to increase the viscosity of the electrolyte, and the amounts of carbohydrates added and the condition under which they were added did not result in the effect aimed at and obtained with my present invention.

I wish now to explain how sugar or other hydrated substances act as an automatic water-supplying reservoir for the electrolytes under consideration, and the conditions which are necessary to insure such action.

In my copending application Ser. No. 548,270 I have fully explained that the most favorable characteristics of a dry condenser designed for a given voltage and purpose, are obtained if its electrolyte has a fixed and predetermined amount of water which is maintained constant, or at least within comparatively narrow limits, throughout the life of the condenser.

The critical percentage of water in the electrolyte depends upon various factors, the most important one being the voltage at which the condenser is formed and used, others being the composition of the electrolyte, the purported use of the condenser, etc. The water content of such dry condensers generally falls within 3% and 30% by weight of the liquid portion of the electrolyte, whereby as a rule the higher voltage condensers require a lower water content and vice versa.

For instance, most of the dry condensers which in operation have to stand about 25 volts or less, have as a rule, a critical water content of 25 to 30%, whereas, condensers designed for high voltages, 500 volts and higher, usually require a water content of 4 to 8%. For intermediate voltages intermediate values of water contents give the best results. All of the percentages of water content hereabove and hereinafter are given in percentage by weight of the liquid portion of the electrolyte.

In general, for each particular type of condenser there exists an optimum or critical value of water content and a comparatively small deviation from this water content brings about, as a rule, a marked deviation from the desired characteristics of the condenser.

It should be kept in mind that when the water content of the electrolyte is, for instance, 5% by weight of the liquid portion of the electrolyte and due to losses by evaporation and decomposition into hydrogen and oxygen, the water content is reduced to 4% of the liquid portion of the electrolyte, the water content of the condenser is actually reduced in the ratio of 5 to 4 or by 20%. A change of 1% (expressed in percentage of the liquid portion of the electrolyte) thus means a considerable change in the water content—especially for the low-water content high voltage condensers—with a corresponding change in the characteristics of the condenser.

The mere addition of such a water-supplying substance, for instance, of sugar, to the electrolyte, does not insure that the loss of water by the electrolyte will be automatically compensated for by a liberation of an equal amount of water from the sugar. To obtain such a condition, as will be more fully explained hereafter, several requirements have to be met. First of all, the sugar, or other hydrated substance has to be added to the electrolyte in a given amount; furthermore, this substance has to be in such a state of equilibrium with the water of the liquid portion of the electrolyte that the tendency of the water escaping from the substance be greater than the tendency of the water escaping from the electrolyte, and finally that part of the substance should always be in the electrolyte in a decomposed condition. Otherwise an automatic compensation will not take place upon loss of water by the electrolyte, and may not take place at all during the life of the condenser. Thus, in spite of the presence of a substantial amount of such substance, the water content of the electrolyte may fall, after a shorter or longer operation of the condenser, below its critical value which impairs its proper operation.

When a substance like sugar is subjected to dehydrating influences it decomposes into carbon or a carbonaceous component and into water. When it decomposes, somewhat over one-half of the weight of the sugar is obtained as water. Generally the water loss of the condenser during its lifetime amounts to one or two per cent of the weight of the liquid portion of the electrolyte. An addition of 5% of sugar (the percentage being again expressed in percentage by weight of the liquid portion of the electrolyte), represents a reservoir of water, giving over 2.5% water, and is usually ample to take care of the entire water loss which may take place during the lifetime of the condenser. For reasons later to be stated I prefer to add a somewhat larger amount of sugar.

The requirement, that the tendency of the water escaping from the sugar be greater than the tendency of the water escaping from the electrolyte, is generally fulfilled when using sugar with the electrolytes commonly employed in dry electrolytic condensers. Thus, provided the dehydration of the sugar, or in other words its decomposition into water and carbon (or carbonaceous substance) has been initiated by loss of water in the electrolyte, the tendency of the system to establish equilibrium will cause the escape of water from the sugar into the electrolyte to take the place of the lost water.

To properly condition the sugar, so that upon water-loss of the electrolyte, it immediately gives off water to the electrolyte, part of the sugar has to be initially brought into a condition of decomposition.

In other words, such a state of equilibrium has to be established between the water content of the liquid portion of the electrolyte and the sugar in solution that, upon unbalancing of this equilibrium by the loss of water from the electrolyte, the equilibrium be re-established by the ceding of water from the sugar to the electrolyte.

To achieve this, sugar is added to the electrolyte, at least in the amount above stated, whereas the electrolyte is given originally an amount of water which is in excess of the critical amount it should have to obtain the desired characteristics of the condenser. The excess amount of water is then removed from the electrolyte, the water content of the electrolyte being checked by measuring the boiling point or conductivity of the electrolyte. When the critical concentration of the electrolyte is reached, some of the sugar dissolved in the electrolyte will decompose into carbon and water, while the sugar remaining in solution acts as a water reservoir. There is thus obtained an equilibrium between the sugar in solution and the water content of the liquid portion of the electrolyte.

When a condenser is impregnated with electrolyte so obtained, as soon as any loss in water of the electrolyte takes place, additional sugar will be decomposed and supply an amount of water equal to that which has been lost by the electrolyte.

Thus the sugar (or other hydrated substance used) will act as a reservoir which automatically makes up the water loss of the electrolyte, whatever the origin of such loss may be, without supplying any excess of water above such loss.

While the temperature may somewhat affect the state of equilibrium existing between the dissolved sugar and the water content of the liquid portion of the electrolyte, the effect of this, under the prevailing operating temperatures of the condenser, is not of sufficient magnitude to greatly influence the results.

As the solubility of the sugar depends on the water content of the electrolyte and on the temperature, and as at the operating temperature prevailing for such condensers it is comparatively low, especially for the high voltage electrolytes of low water content, I prefer as a rule, especially in the latter case, to add some sugar in excess of that amount which is soluble in the electrolyte. This undissolved excess sugar serves as a secondary water-supplying reservoir.

Thereby, when, due to water loss of the electrolyte, part of the dissolved sugar decomposes to make up this water loss part of the undissolved sugar in an amount equal to the so decomposed sugar, goes into solution, whereby the amount of dissolved sugar (the primary reservoir) also remains substantially constant.

While the water content of the electrolyte, as stated, should be kept constant within narrow limits, the maintenance of the exact water content is usually more critical with regard to electrolytes for high voltage condensers than for low voltage condensers. For instance, in a high voltage condenser having an electrolyte with an initial water content of about 5%, by the proper addition of 5 to 10% sugar, the variations in the water content of the electrolyte can be kept within less than one per cent during the whole lifetime of the condenser.

For low voltage condensers, which have more water in their electrolytes, there is usually a somewhat larger loss of water during the life of the condenser and I prefer to add a somewhat larger amount of sugar, for instance, 10 to 15%.

While the minimum amount of sugar to be added is critical, the maximum amount of sugar depends only on secondary considerations. As a rule, too much sugar increases the series resistance and power factor of the condenser and decreases its effective capacity, which places a practical limitation as to the maximum amount of sugar to be added. As this drawback as a rule is more serious for high voltage condensers than it is for low voltage condensers, the amount of sugar added to the electrolyte of high voltage condensers is usually to be carefully determined, for each individual type of condenser.

The carbon or carbonaceous decomposing substances going into the electrolyte do no apparent harm to the condenser and in many instances may even have beneficial effects, for example, by increasing the conductivity of the electrolyte, reduce the power factor of the condenser.

In the drawing forming part of the specification the single figure is a sectionized side-view of a dry condenser embodying my invention.

1 and 2 are the electrodes of the condenser, shown as foils, at least one of which is of aluminum, tantalum, zirconium, or other similar filming metal. Condensers for rectified current circuits usually require only one of the electrodes to be filmed, whereas condensers used in alternating current circuits usually require both the electrodes to be filmed.

The filmed electrode or electrodes of the condenser are preferably preformed, by any suitable method, for example by the process described in my copending application Serial No. 548,270. The spacers 3—3, which may be of gauze, cellophane, paper, etc., carry the electrolyte 4 and are impregnated therewith, either before or after the assembly of the condenser.

The electrodes 1 and 2 are provided with wire leads 5 and 6 respectively which pass through the cover 9 of insulating material, closing the container 7. A vent hole 8 or other venting means are usually provided for the escape of the liberated gases.

The electrolyte comprises as ionogen usually a weak acid of the type of boric acid, phosphoric acid, citric acid, etc., and preferably also a salt of a weak acid, which does not need to be the salt of the acid used, and is preferably an alkaline or ammonium salt of a weak acid. The solvent of the electrolyte comprises as a rule a polyhydric alcohol, for instance, glycerol, ethylene glycol, etc., together with a definite amount of water, the water content falling as a rule between 3 to 30% by weight of the liquid portions of the electrolyte. The water content of high voltage condensers is as a rule lower, and of the order of 4 to 8%; for lower voltage condensers the water content increases, and for the lowest voltages it is about 25 to 30%. The electrolyte may also comprise one or more inert substances of the types previously stated.

To maintain the water content of the electrolyte constant during the life of the condenser, I add thereto in accordance with the invention, a hydrated substance, for instance sugar, of which I take about 5 to 20% of the weight of the electrolyte, depending on the type of condenser and the electrolyte used. The electrolyte, when the sugar is added, contains an amount of water in excess of that desired in the finished electrolyte. After the addition and at least partial dissolution of the sugar, the excess water is removed by heating, the proper water content being checked by measuring the boiling point and/or the conductivity of the electrolyte. By this process part of the dissolved sugar is brought into decomposition so that a state of equilibrium is obtained between the water of the liquid portion of the electrolyte and the dissolved sugar, and when, due to the loss of water by the electrolyte, this equilibrium is disturbed, it is automatically reestablished by additional sugar decomposing and giving off an amount of water to the electrolyte equal to that lost by same.

As a rule, there is also an amount of solid (undissolved) sugar in the electrolyte, especially in the low water-content electrolyte, part of which goes into solution upon decomposition of a corresponding amount of dissolved sugar.

It should be kept in mind that the whole system is in proper operative condition only if the water content of the electrolyte is within such limits where the sugar reacts readily. Otherwise a considerable amount of water would be lost from the electrolyte before the sugar would give off water, and the water content of the electrolyte would fall far below the permissible value before the supply of water by the sugar starts. It is quite likely that under such conditions no water at all is supplied by the sugar during the whole lifetime of the condenser.

As stated, besides sugar other soluble carbohydrates, as sucrose, dextrose, glucose, etc., may be used, the results obtained depending to some extent on the specific electrolyte used in connection with such substances.

In some cases, especially for high voltage condensers having a low water content electrolyte, non-soluble carbohydrates, for instance starch, can also be used as the water-supplying substance. Whereas non-soluble carbohydrates, as starch, can be brought in desired state of equilibrium at which the starch can be dehydrated, with electrolytes having a comparatively low water content, such a state of equilibrium, as a rule, cannot be obtained with high water content electrolytes.

As water-supplying agents, besides the carbohydrates, other insoluble hydrated substances may be used, provided they meet the requirements of giving off water with comparative ease, of being dehydrated under conditions of equilibrium with the electrolyte, and of having constituents which are not harmful to the electrolyte. Such substances can be used, as a rule, only with low water content electrolytes, for similar reasons as have been stated in connection with the non-soluble carbohydrates. Substances falling in this group are, for instance, calcium phosphate and magnesium borate, each of which contains water of crystallization which may be given off under proper conditions of equilibrium.

As a rule, however, I prefer to use carbohydrates as sugar, the decomposition material of which, namely, the carbon, instead of being deleterious or neutral with regard to the properties of the electrolyte, has a tendency to improve the electrolyte as has been already explained.

What I now claim as new and desire to secure by Letters Patent is:

1. An electrolytic condenser comprising at least one film-forming electrode, and a viscous electrolyte comprising a fixed amount of water, and a dehydratable substance, said substance being in such a condition of equilibrium with regard to the electrolyte that upon any loss of water from the electrolyte a dehydration of said substance takes place.

2. An electrolytic condenser comprising at least one film-forming electrode and a viscous electrolyte comprising an ionogen and a solvent, and also comprising a critical amount of water, said water being within the range of 3 to 30% by weight of the liquid portion of the electrolyte, and a hydrated substance in said electrolyte, at least a portion of said substance being in solution, said dissolved portion being in such a condition of equilibrium with regard to the water of the electrolyte that upon loss of water from the electrolyte, said dissolved substance decomposes with the liberation of water.

3. An electrolytic condenser comprising at least one film-forming electrode, and a viscous electrolyte comprising a critical amount of water, and a dehydratable carbohydrate, said carbohydrate being in such a condition of equilibrium with regard to the electrolyte that upon any loss of water from the electrolyte a dehydration of the carbohydrate takes place.

4. An electrolytic condenser comprising at least one film-forming electrode, and a viscous electrolyte comprising a critical amount of water and sugar, said sugar being at least partly dissolved in the electrolyte and in such a condition of equilibrium with regard to the electrolyte, that upon any loss of water from the electrolyte a dehydration of the sugar takes place.

5. An electrolytic condenser comprising at least one film-forming electrode, a viscous electrolyte comprising a critical amount of water and, a substance having water of crystallization which it can give off with ease upon a dehydrating influence, said substance and the water of the electrolyte being in a state of equilibrium in which upon any loss of water from the electrolyte dehydration of said substance takes place.

6. A viscous electrolyte comprising an ionogen, a polyhydric alcohol and a fixed amount of water, and a hydrated substance in said electrolyte, the escaping tendency of water from said hydrated substance being greater than the escaping tendency of water from said electrolyte.

7. In the process of manufacturing dry electrolytic condensers, preparing an electrolyte by adding to an ionogen a solvent comprising a polyhydric alcohol and water, adding to said electrolyte a hydrated substance and dissolving said substance in the electrolyte, removing water from the electrolyte to reduce its water content to a critical value, and thereby partly decomposing the dissolved substance, and impregnating with said electrolyte a condenser assembly.

8. In the operation of dry electrolytic condensers having a viscous electrolyte which comprises a limited and critical amount of water, comprising the steps, of adding to said electrolyte a hydrated substance, and automatically dehydrating said substance in operation of the condenser to compensate in the exact amount for any water loss of the electrolyte which takes place in the condenser during operation.

9. A viscous electrolyte comprising a weak acid, a salt of a weak acid, a polyhydric alcohol and water, said water forming 3 to 30% by weight of the liquid portion of the electrolyte and 5 to 15% sugar in said electrolyte, said sugar being at least partly dissolved in the electrolyte and having a portion in the process of decomposition.

10. An electrolytic condenser for high voltages comprising at least one film-formed electrode and a cooperating electrode, a spacer between said electrodes, and a viscous electrolyte carried by said spacer, said electrolyte comprising 4 to 8% water and 5 to 10% sugar, said sugar being at least partly dissolved in the electrolyte and having a portion in the process of decomposition.

11. An electrolytic condenser for low voltages comprising at least one film-formed electrode and a cooperating electrode, a spacer between said electrodes, and a viscous electrolyte carried by said spacer, said electrolyte comprising 25 to 30% water and 5 to 15% sugar, said sugar being at least partly dissolved in the electrolyte and having a portion in the process of decomposition.

PRESTON ROBINSON.